United States Patent [19]

Ghirga et al.

[15] 3,683,043

[45] Aug. 8, 1972

[54] METHOD OF PREPARING ALKYLBENZENES

[72] Inventors: Marcello Ghirga, Via Grandi 5; Natale Bertolini, Via Amedeo 54; Lucio Di Fiore, Via Piermarini 10, all of Milan, Italy

[22] Filed: Feb. 2, 1971

[21] Appl. No.: 112,034

[30] Foreign Application Priority Data

Feb. 4, 1970 Italy....................20197 A/70

[52] U.S. Cl. ...........................................260/671 B
[51] Int. Cl. ...............................................C07c 3/56
[58] Field of Search ......................260/671 B, 671 G

[56] References Cited

UNITED STATES PATENTS 3,207,800   9/1965   Williamson et al.....260/671 B
3,383,430   5/1968   Hutson et al...........260/671 B
3,478,111   11/1969  Sorgenti................260/671 B

*Primary Examiner*—Curtis R. Davis
*Attorney*—Sughrue, Rothwell, Mion, Zinn & Macpeak

[57] ABSTRACT

In the production of linear alkylbenzenes by continuous alkylation of benzene with linear chloroparaffins $C_9 - C_{15}$ in the presence of aluminum trichloride, the spent catalytic complex has added thereto aluminum trichloride to provide a total amount of 30–35 wt. percent bound and unbound $AlCl_3$ therein, and is activated by adding thereto a specific amount of hydrogen chloride and heating for at least one hour at 30°–60° C. The complex activated in this manner is used as catalyst in the alkylation stage. Odorless, high-grade linear alkylbenzenes are obtained.

3 Claims, No Drawings

METHOD OF PREPARING ALKYLBENZENES

The invention relates to an improvement in methods of preparing alkylbenzenes; more particularly it relates to the preparation of alkylbenzenes in which the alkyl radical is a linear paraffinic chain containing nine to 15 carbon atoms.

It is known that these products are highly valuable in synthesis of biologically soft detergents.

In former times detergents of the alkylbenzene sulphonate type have been used, which were manufactured by alkylating benzene by means of a mixture of olefins averaging about 12 carbon atoms in a highly branched molecule (propylene tetramer) and sulphonating the alkylation product. These compounds withstand metabolic attack by all types of bacteria. Consequently they are hardly removable from sewage, which results in contamination of rivers.

At the present time biologically soft detergents of the alkylbenzene sulphonate type are used, in which the alkyl radical is a linear (straight) paraffinic chain (linear alkylbenzenes).

The latter are usually prepared commercially by chlorination of linear paraffins (n-paraffins), catalytic alkylation of benzene by means of the resultant chlorinated paraffins, separation of the catalyst, and fractionation of the alkylated product.

In such processes in order to obtain a maximum monochloro-paraffin output, the chlorination step is carried out with a high paraffin/chlorine molar ratio. This yields a mixture of chlorinated paraffins and unreacted paraffins which, because of the difficulties of separation, is used as such in the alkylation step. The unreacted paraffins are subsequently recovered by distillation from the alkylation products and are recycled to the chlorination stage.

In the prior process just described certain by-products progressively accumulate both in the recycled paraffins and in the alkylbenzene product. The causes of this accumulation are not fully known, but it is believed that during the alkylation isomerization and degradation reactions occur which are catalyzed by the alkylation catalyst, the latter usually comprising aluminum trichloride. Thus, by-products such as light alkylbenzenes would be formed by degradation of heavier alkylbenzenes, as well as by alkylation of benzene by degradation products of the paraffins themselves.

These by-products boil within the boiling range of the n-paraffins employed and are therefore difficult to separate from the resultant mixtures. When such by-products are recycled together with unreacted paraffins, they probably undergo further modifications at the chlorination and alkylation steps, and form heavier products which, at the subsequent distillation step, separate with the alkylbenzenes.

In conclusion, the prior process described yields alkylbenzenes with a high impurity content, particularly comprising over-chlorinated products and substances of an undesirable smell.

On account of the presence of the over-chlorinated by-products such alkylbenzenes exhibit undesirable properties, especially corrosiveness and toxicity.

In the processes in which n-paraffins are used, alkylbenzenes are also produced having a branched lateral chain (branched alkylbenzenes). The latter are probably originated from isomerization of linear alkylbenzenes or from alkylation of benzene by isomerization or degradation products of n-paraffins or chloroparaffins. Whichever the causes may be, said processes yield alkylbenzenes having a branched alkylbenzenes content higher than about 10 percent by weight.

It is an object of this invention to provide a method for preparing high-grade, biologically soft linear alkylbenzenes by catalytically alkylating benzene with chlorinated n-paraffins in the presence of a catalyst essentially comprising aluminum trichloride.

It is a further object of this invention to provide a method for preparing high-grade linear alkylbenzenes having a branched alkylbenzenes content not higher than 5 percent by weight, typically not higher than 3 percent by weight.

Other and related objects of this invention will be apparent from the following description.

It has been found that the drawbacks mentioned hereinbefore may be avoided by a particular manner of re-use of the spent alkylation catalyst, the latter consisting of a chemically complex liquid in which aluminum trichloride is variously combined with the hydrocarbons present in the alkylation mixture (benzene, paraffins, chloroparaffins, degradation products, etc.). More particularly, according to the background of this invention, it is assumed that $AlCl_3$ used in the alkylation step of benzene is hardly present as such in the alkylation mixture and rather forms a "-catalytic complex" with the hydrocarbons present; initially, the "catalytic complex" contains a relatively low amount of organic moieties and the $AlCl_3$-proportion therein is correspondingly high (generally in excess of 40 percent by weight). As the reaction proceeds, further hydrocarbon moieties are bound by the "catalytic complex," whereby the weight-percentage provided by $AlCl_3$ in the complex progressively sinks; the complex is considered as "spent" when said weight-percentage is below 25–20 percent. In a conventional process, a convenient part of the spent complex is admixed with a fresh proportion of $AlCl_3$, thereby to restore the initial proportion of over 40% $AlCl_3$, and recirculated to the alkylation reactor; the remaining part (if any) is discarded.

According to the invention, in a process as depicted above wherein spent catalytic complex is separated from the alkylation products in liquid condition, admixed with fresh aluminum chloride and recirculated to the alkylation zone, said fresh aluminum chloride is added in an amount providing in the complex a total proportion of 30 percent to 35 percent by weight of bound and unbound $AlCl_3$, whereupon the so replenished complex is activated by adding thereto 1 to 3 mols anhydrous hydrogen chloride per mol $AlCl_3$ and heating for at least 1 hour at a temperature from 30° to 60° C, and the activated complex is recirculated to the alkylation zone in a proportion from 0.25 to 0.35 parts by weight per part by weight chlorinated paraffins, the alkylation being carried out at a temperature between room temperature (about 18°–20° C) and the normal boiling point of benzene (80.1° C). The activating heating is preferably applied for more than 1 hour, without however exceeding about 5 hours.

By operating in the conditions just defined above, an odourless alkylbenzene product is obtained, typically containing less than 5 wt. percent, branched alkylbenzenes.

The entire process is preferably carried out as follows.

A commercial mixture of n-paraffins having from nine to 15 carbon atoms is continuously chlorinated in a manner known per se by means of gaseous chlorine, the molar ratio of paraffins to chlorine being preferably from 2:1 to 10:1 in order to obtain a maximum of monochlorinated paraffins. The effluent product is a mixture of chlorinated paraffins and unreacted paraffins, which is continuously fed as such to an alkylation zone to which benzene and an activated catalytic complex (as hereinbefore described) are continuously supplied. A high molar ratio (such as from 3:1 to 10:1) of benzene to chloroparaffins in the feed is preferably used. In the conditions indicated hereinbefore, the alkylation reaction takes a time of from 1 to 3 hours. The effluent alkylation mixture is conveyed to a decanter, in which the spent catalytic complex is separated as a heavy phase. The light phase from the decanter is fractionated in order to separate unreacted benzene, unreacted paraffins and alkylbenzene product, the separated benzene being returned to the alkylation zone and the separated paraffins being recycled to the chlorination zone. The separated spent complex (or a convenient part thereof) is recharged with $AlCl_3$ and activated in the manner described hereinbefore, and recirculated to the alkylation zone.

EXAMPLE 1

In a pilot plant a mixture of 99 percent pure n-paraffins and gaseous chlorine are continuously fed at the foot of a vertical tubular reactor.

The paraffin mixture comprises fresh n-paraffins (30 percent) and the fraction of the n-paraffins (70 percent) which is recycled from the distillation step. The n-paraffins contain 10 to 14 carbon atoms, the average number of carbon atoms in the molecule being about 11.6. The chlorine is fed at a rate of about 270 Kg/hr, and n-paraffins are fed at the rate of about 2,150 Kg/hr. The temperature in the chlorination reactor is maintained at about 110° C.

From the top of the chlorination reactor a mixture of chlorinated paraffins and unreacted paraffins is drawn, which is fed to an alkylation reactor together with benzene and an activated catalytic complex. The benzene is fed at a rate of about 2200 Kg/hr, and the activated catalytic complex is fed at the rate of about 235 Kg/hr.

The temperature in the alkylation reactor is maintained at about 70° C, and the volume of the reactor provides a residence time of about 2 hours.

The alkylation mixture drawn from the reactor is decanted to separate the spent catalytic complex, washed with a 5 percent sodium hydroxide solution, then with water to neutrality, and finally fractionated in order to separate benzene, unreacted paraffins and akylbenzenes.

About 1500 Kg/hr paraffins are recovered for recycle, as well as 780 Kg/hr alkylbenzenes. The alkylbenzenes are odourless and have a branched alkylbenzenes content of about 2 percent by weight.

From the bottom of the distillation column for the alkylbenzenes, heavy products are recovered in an amount of about 90 Kg/hr.

The spent catalytic complex, containing less than 25 wt. percent $AlCl_3$ (calculated on the basis of aluminum present), is recharged with $AlCl_3$ to a total content of 30 wt. percent and the resulting suspension is heated at 45° C for 1.5 hours, while anhydrous gaseous hydrogen chloride is supplied thereto and absorbed thereby at a rate of 12 normal liters/hour (providing 2 mols hydrogen chloride per mol $AlCl_3$). The catalytic complex activated in this manner is used as the hereinbefore described feed (235 Kg/hour) for the alkylation reactor.

EXAMPLE 2

The procedure of Example 1 is repeated by feeding to the alkylation reactor 215 Kg/hr of an activated catalytic complex having a total aluminum trichloride content of about 32.5 percent by weight.

The activation of the complex is carried out as described in Example 1.

Odourless alkylbenzenes are obtained having a branched alkylbenzenes content of about 3.5 percent by weight.

EXAMPLE 3

The procedure of Example 1 is repeated by feeding to the alkylation reactor 200 Kg/hr of an activated catalytic complex having a total aluminum trichloride content of almost 35 percent by weight.

The activation of the complex is carried out as described in Example 1.

Odourless alkylbenzenes are obtained having a branched alkylbenzenes content of about 4.5 percent by weight.

EXAMPLE 4

The procedure of Example 1 is repeated by feeding to the alkylation reactor 175 Kg/hr of a catalytic complex obtained by loading the spent complex with aluminum trichloride up to a total content of about 40 percent by weight. The activation of the complex is carried out as described in Example 1.

Alkylbenzenes are obtained having a branched alkylbenzenes content of about 12 percent by weight and a pungent paraffinic smell.

Similar results are obtained when alkylation is carried out by means of catalytic complexes obtained from the spent catalytic complexes by adding aluminum trichloride up to a content of 30 percent, 32.5 percent, 35 percent and 40 percent, without activation of the loaded complex.

What we claim is:

1. A process for continuously producing linear alkylbenzenes by: partially chlorinating linear paraffins having nine to 15 carbon atoms in the molecule in a chlorinating zone to obtain chlorinated paraffins; employing the chlorinated paraffins for alkylating a molar excess of benzene in an alkylating zone in the presence of a catalyst comprising aluminum trichloride; separating from the alkylation reaction mixture a spent catalytic complex; fractionating the remaining mixture into unreacted benzene, unreacted paraffins and alkylbenzene product; recirculating the unreacted benzene and unreacted paraffins to the alkylating and chlorinating zones, respectively; admixing part at least of the spent catalytic complex with fresh aluminum trichloride for re-use in the alkylating zone; said process being characterized in that:

the spent catalytic complex is admixed with said fresh aluminum chloride in an amount providing in the complex a total proportion of 30 percent to 35 percent by weight of bound and unbound $AlCl_3$;

the so replenished complex is activated by adding thereto 1 to 3 mols anhydrous hydrogen chloride per mol $AlCl_3$ and heating for at least one hour at a temperature from 30° to 60° C;

the activated complex is recirculated to the alkylation zone in a proportion of from 0.25 to 0.35 parts by weight per part by weight chlorinated paraffins;

the alkylation is carried out at a temperature between room temperature and the normal boiling point of benzene.

2. The process of claim 1, wherein said heating is carried out for 1 to 5 hours.

3. The process of claim 1 or 2, wherein said molar excess benzene is from 3 to 10 mols benzene per mol chloroparaffin.

* * * * *